United States Patent
Izumi et al.

(10) Patent No.: US 8,861,670 B2
(45) Date of Patent: Oct. 14, 2014

(54) METHOD AND APPARATUS FOR CONDENSATE DEMINERALIZATION

(75) Inventors: Takeshi Izumi, Yokohama (JP); Masahiro Hagiwara, Yokohama (JP)

(73) Assignee: Ebara Corporation, Tokyo (JP)

( * ) Notice: Subject to any disclaimer, the term of this patent is extended or adjusted under 35 U.S.C. 154(b) by 973 days.

(21) Appl. No.: 12/470,053

(22) Filed: May 21, 2009

(65) Prior Publication Data

US 2009/0296873 A1    Dec. 3, 2009

(30) Foreign Application Priority Data

May 22, 2008 (JP) ................................. 2008-134409

(51) Int. Cl.
| | | |
|---|---|---|
| *G21C 19/00* | (2006.01) | |
| *G21C 19/307* | (2006.01) | |
| *B01J 47/02* | (2006.01) | |
| *B01J 47/04* | (2006.01) | |
| *G21F 9/04* | (2006.01) | |
| *G21F 9/12* | (2006.01) | |
| *C02F 1/42* | (2006.01) | |
| *C02F 101/10* | (2006.01) | |
| *C02F 103/04* | (2006.01) | |
| *C02F 103/02* | (2006.01) | |

(52) U.S. Cl.
CPC ............ *C02F 1/42* (2013.01); *C02F 2001/422* (2013.01); *G21C 19/307* (2013.01); *B01J 47/028* (2013.01); *B01J 47/04* (2013.01); *C02F 2001/427* (2013.01); *G21F 9/04* (2013.01); *C02F 2101/101* (2013.01); *C02F 2001/425* (2013.01); *G21F 9/12* (2013.01); *C02F 2103/04* (2013.01); *C02F 2103/023* (2013.01)
USPC ......................................................... 376/313

(58) Field of Classification Search
USPC .......... 376/277, 305, 306, 308, 309, 310, 311, 376/312, 313, 316; 210/634, 638, 660, 263
See application file for complete search history.

(56) References Cited

U.S. PATENT DOCUMENTS

| | | |
|---|---|---|
| 6,456,683 B1 | 9/2002 | Izumi et al. |
| 6,633,624 B1 * | 10/2003 | Ito et al. .......................... 376/313 |

FOREIGN PATENT DOCUMENTS

| | | |
|---|---|---|
| JP | 55-134689 | 10/1980 |
| JP | 60-68092 | 4/1985 |

(Continued)

OTHER PUBLICATIONS

DIAION PA308 chloride form, Sigma-Aldrich Co. LLC., Retrieved from www.sigmaaldrich.com on Sep. 21, 2011.*

(Continued)

*Primary Examiner* — Timothy A Brainard
(74) *Attorney, Agent, or Firm* — Wenderoth, Lind & Ponack, L.L.P.

(57) ABSTRACT

A method and an apparatus for performing a condensate demineralization treatment within a condensate demineralization apparatus of a nuclear power plant, which are capable of producing a high-purity treated water containing a low concentration of sulfate ions derived from the TOC eluted from a cation exchange resin. A condensate demineralization method for performing a demineralization treatment of a condensate from a nuclear power plant using an ion exchange resin, wherein the demineralization treatment of the condensate is performed by bringing the condensate into contact with an ion exchange resin bed that includes a mixed bed prepared by uniformly mixing a strongly acidic gel-type cation exchange resin and a strongly basic type 1 porous anion exchange resin having a cross-linking within a range from 1% to 4%.

17 Claims, 4 Drawing Sheets

(56) References Cited

FOREIGN PATENT DOCUMENTS

| JP | 61-138589 | 6/1986 | | |
|---|---|---|---|---|
| JP | 1-174998 | 7/1989 | | |
| JP | 2-131187 | 5/1990 | | |
| JP | 2-131188 | 5/1990 | | |
| JP | 02131187 A * | 5/1990 | ............... | C02F 1/42 |
| JP | 04108588 A * | 4/1992 | | |
| JP | 5-131189 | 5/1993 | | |
| JP | 7-323235 | 12/1995 | | |
| JP | 8-224579 | 9/1996 | | |
| JP | 08224579 A * | 9/1996 | | |
| JP | 9-276862 | 10/1997 | | |
| JP | 10-85739 | 4/1998 | | |
| JP | 11-197661 | 7/1999 | | |
| JP | 11-352283 | 12/1999 | | |
| JP | 2001-215294 | 8/2001 | | |
| JP | 2001-314855 | 11/2001 | | |
| JP | 2002-1328 | 1/2002 | | |
| JP | 2004-81927 | 3/2004 | | |
| JP | 2004-255292 | 9/2004 | | |
| JP | 2004-279227 | 10/2004 | | |
| JP | 2005-296749 | 10/2005 | | |
| JP | 2007-64646 | 3/2007 | | |

OTHER PUBLICATIONS

Amberlite IR120 Na, Strongly acidic Cation Exchange Resin, Rohm and Haas Ion Exchange Resins, Apr. 1999.*

Chinese Office Action issued Dec. 24, 2010 in counterpart Chinese Patent Application No. 200910138467.1.

Japanese Office Action issued Sep. 13, 2011 in corresponding Japanese Application No. 2008-134409.

* cited by examiner

METHOD AND APPARATUS FOR CONDENSATE DEMINERALIZATION

CROSS REFERENCE TO RELATED APPLICATION

Priority is claimed on Japanese Patent Application No. 2008-134409, filed May 22, 2008, the content of which is incorporated herein by reference.

BACKGROUND OF THE INVENTION

1. Field of the Invention

The present invention relates to a condensate treatment conducted in a condensate demineralization apparatus of a nuclear power plant, and relates particularly to a method and apparatus for condensate demineralization that enable a high-purity treated water, having a low concentration of sulfate ions derived from organic impurities eluted from a cation exchange resin, to be obtained in a stable manner over a long period of time.

2. Description of Related Art

In a nuclear power plant, following electric power generation using the steam generated within the nuclear reactor or steam generator, the steam is cooled using seawater, and the resulting condensate is then treated with ion exchange resins in a condensate demineralization apparatus, before being fed back into the nuclear reactor or steam generator. This condensate may include seawater components that have seeped into the condensate system, suspended corrosion products generated from plant structural materials and composed mainly of iron oxides (hereafter referred to as "crud"), and ionic impurities. In order to remove these impurities to obtain a high-purity treated water, the nuclear power plant is provided with a condensate demineralization apparatus that uses ion exchange resins to perform a demineralization treatment of the condensate. The ion exchange resins used in the condensate demineralization apparatus include a cation exchange resin that adsorbs cations, and an anion exchange resin that adsorbs anions, and these resins are typically used in combination.

In this condensate demineralization apparatus, in those cases where a cation exchange resin and an anion exchange resin are used in combination, typical examples of the resin combination include combinations of a gel-type cation exchange resin and a gel-type anion exchange resin, and combinations of a porous cation exchange resin and a porous anion exchange resin. Generally, gel-type resins have low osmotic resistance, whereas porous resins have low abrasion resistance, and in consideration of these drawbacks, gel-type resins are typically used in the condensate demineralization apparatus of plants where backwashing regeneration is conducted frequently, whereas porous resins are used in those plants where chemical regeneration is conducted frequently. Porous resins have particularly low abrasion resistance, and therefore during transfer within the condensate demineralization apparatus from the demineralization tower that houses the ion exchange resin bed to the regeneration tower that performs regeneration of the ion exchange resin, contact between resin particles or between resin particles and metal materials may cause damage to the surface of the resin particles or even fracture of the resin particles. Accordingly, in plants such as BWR nuclear power plants where backwashing is used to strip the crud adhered to the surface of the cation exchange resin, a combination of a gel-type cation exchange resin and a gel-type anion exchange resin is typically used due to the more favorable abrasion resistance of these exchange resins.

Moreover, in a porous resin, the resin matrix structure is more dense than that of a gel-type resin, and therefore the rate of diffusion of an adsorbed ion into the particle interior is slower than that observed for a gel-type resin, meaning porous resins tend to exhibit inferior performance in terms of reaction rate and regeneration efficiency. As a result, in those cases where a porous resin is used in a condensate demineralization apparatus, the apparatus design must take these properties of porous resins into consideration, for example by providing an increased regeneration level (namely, the amount of chemical used).

The ion exchange resin used in the condensate demineralization apparatus of a nuclear power plant exhibits a superior removal capability for ionic components such as seawater components typified by NaCl introduced from the upstream side of the resin, but a problem arises in that organic impurities (hereafter abbreviated as "TOC") composed mainly of polystyrenesulfonic acids tend to be eluted from the cation exchange resin. If this TOC is carried into the nuclear reactor or steam generator, then sulfate ions are generated, which causes a deterioration in the water quality within the nuclear reactor or the steam generator.

Accordingly, in order to raise the nuclear reactor or steam generator water quality to a higher level of purity, the amount of leaked TOC eluted from the demineralization tower filled with the ion exchange resins must be minimized.

Examples of methods that have been proposed to address this problem include a method disclosed in Japanese Unexamined Patent Application, First Publication No. Hei 11-352283, in which a strongly acidic gel-type cation exchange resin is used that has a cross-linking degree of 12 to 16% that is considerably higher than the more typically used cross-linking degree of 8 to 10%, a method disclosed in Japanese Unexamined Patent Application, First Publication No. 2001-314855, in which the anion exchange resin is positioned as the lower layer of the ion exchange resin bed so as to adsorb the TOC eluted from the cation exchange resin, and a method disclosed in Unexamined Patent Application, First Publication No. Hei 8-224579, in which a mixed bed is formed using a strongly acidic gel-type cation exchange resin and a porous anion exchange resin having a Gaussian particle size distribution.

SUMMARY OF THE INVENTION

However, even if a strongly acidic gel-type cation exchange resin having a high cross-linking degree is used, extended use over a long period leads to oxidative degradation, and the elution of TOC gradually increases, meaning a deterioration in the water quality compared with the quality obtained when the exchange resin was first used is unavoidable.

Further, in the method in which the anion exchange resin is positioned as the lower layer of the ion exchange resin bed, although the concentration of the low molecular weight TOC eluted from the cation exchange resin can be reduced, the removal capacity for the high molecular weight TOC tends to be inadequate.

Furthermore, because they contain macropores, porous anion exchange resins have a satisfactory TOC adsorption capacity, but in the types of porous anion exchange resins typically used in the condensate demineralization apparatus of nuclear power plants, such as the products IRA900 manufactured by Rohm and Haas Japan Co., Ltd., and PA312 marketed by Mitsubishi Chemical Corporation, because the porous ion exchange resin has macropores, the resin matrix portion tends to have an extremely dense structure, meaning the ability of the resin to incorporate adsorbed material internally is not particularly high.

The present invention has been developed in light of the above circumstances, and has an object of providing a method and an apparatus for conducting a condensate demineralization treatment within the condensate demineralization apparatus of a nuclear power plant, which are capable of producing a high-purity treated water containing a low concentration of sulfate ions derived from the TOC eluted from the cation exchange resin.

In order to achieve the above object, the present invention provides a condensate demineralization method for performing a demineralization treatment of a condensate from a nuclear power plant using an ion exchange resin, in which the demineralization treatment of the condensate is performed by bringing the condensate into contact with an ion exchange resin bed, wherein the ion exchange resin bed includes a mixed bed containing a strongly acidic gel-type cation exchange resin and a strongly basic type 1 porous anion exchange resin, the cross-linking degree of the strongly basic type 1 porous anion exchange resin is within a range from 1% to 4%, and in the mixed bed, the cation exchange resin and the anion exchange resin are mixed uniformly.

Furthermore, the present invention also provides a condensate demineralization method for performing a demineralization treatment of a condensate from a nuclear power plant using an ion exchange resin, wherein the demineralization treatment of the condensate is performed by bringing the condensate into contact with an ion exchange resin bed including:

(a) an upper layer composed of a mixed bed prepared by uniformly mixing a strongly acidic gel-type cation exchange resin and a strongly basic type 1 porous anion exchange resin having a cross-linking degree within a range from 1% to 4%, and (b) a lower layer composed of an anion exchange resin.

The anion exchange resin used in the lower layer is preferably a strongly basic type 1 porous anion exchange resin having a cross-linking degree within a range from 1% to 4%, and is more preferably the same ion exchange resin as the anion exchange resin incorporated within the mixed bed of the upper layer.

Furthermore, the present invention also provides a condensate demineralization method for performing a demineralization treatment of a condensate from a nuclear power plant using an ion exchange resin, wherein the demineralization treatment of the condensate is performed by bringing the condensate into contact with an ion exchange resin bed including:

(a) an upper layer composed of a cation exchange resin, and (b) a lower layer composed of a mixed bed prepared by uniformly mixing a strongly acidic gel-type cation exchange resin and a strongly basic type 1 porous anion exchange resin having a cross-linking degree within a range from 1% to 4%.

The cation exchange resin used in the upper layer is preferably a strongly acidic gel-type cation exchange resin, and is more preferably the same ion exchange resin as the cation exchange resin incorporated within the mixed bed of the lower layer.

Furthermore, the present invention also provides a condensate demineralization method for performing a demineralization treatment of a condensate from a nuclear power plant using an ion exchange resin, wherein the demineralization treatment of the condensate is performed by bringing the condensate into contact with an ion exchange resin bed including:

(a) a top layer composed of a cation exchange resin, (b) a middle layer composed of a mixed bed prepared by uniformly mixing a strongly acidic gel-type cation exchange resin and a strongly basic type 1 porous anion exchange resin having a cross-linking degree within a range from 1% to 4%, and (c) a bottom layer composed of an anion exchange resin.

The cation exchange resin used in the top layer is preferably a strongly acidic gel-type cation exchange resin, and is more preferably the same ion exchange resin as the cation exchange resin incorporated within the mixed bed of the middle layer. The anion exchange resin used in the bottom layer is preferably a strongly basic type 1 porous anion exchange resin having a cross-linking degree within a range from 1% to 4%, and is more preferably the same ion exchange resin as the anion exchange resin incorporated within the mixed bed of the middle layer.

In one aspect of the condensate demineralization method of the present invention, a strongly acidic gel-type cation exchange resin having a cross-linking degree within a range from 12 to 16% is preferably used as the strongly acidic gel-type cation exchange resin.

In another aspect of the condensate demineralization method of the present invention, a strongly acidic gel-type cation exchange resin having a cross-linking degree within a range from 4 to 7% is preferably used as the strongly acidic gel-type cation exchange resin.

Furthermore, a mixed bed that has been mixed uniformly so that the existence ratio of the anion exchange resin is within ±5% of the design standard value across the entire mixed bed may be used as the above-mentioned mixed bed.

Furthermore, the present invention also provides a condensate demineralization apparatus for a nuclear power plant that performs a demineralization treatment of a condensate using an ion exchange resin, in which the condensate demineralization apparatus has an ion exchange resin bed, and the demineralization treatment of the condensate is performed by bringing the condensate into contact with the ion exchange resin bed, wherein the ion exchange resin bed includes a mixed bed containing a strongly acidic gel-type cation exchange resin and a strongly basic type 1 porous anion exchange resin, the cross-linking degree of the strongly basic type 1 porous anion exchange resin is within a range from 1% to 4%, and in the mixed bed, the cation exchange resin and the anion exchange resin are mixed uniformly.

Furthermore, the present invention also provides a condensate demineralization apparatus for a nuclear power plant that performs a demineralization treatment of a condensate using an ion exchange resin, wherein the demineralization treatment of the condensate is performed by bringing the condensate into contact with an ion exchange resin bed including:

(a) an upper layer composed of a mixed bed prepared by uniformly mixing a strongly acidic gel-type cation exchange resin and a strongly basic type 1 porous anion exchange resin having a cross-linking degree within a range from 1% to 4%, and (b) a lower layer composed of an anion exchange resin.

The anion exchange resin used in the lower layer is preferably a strongly basic type 1 porous anion exchange resin having a cross-linking degree within a range from 1% to 4%, and is more preferably the same ion exchange resin as the anion exchange resin incorporated within the mixed bed of the upper layer.

Furthermore, the present invention also provides a condensate demineralization apparatus for a nuclear power plant that performs a demineralization treatment of a condensate using an ion exchange resin, wherein the demineralization treatment of the condensate is performed by bringing the condensate into contact with an ion exchange resin bed including:

(a) an upper layer composed of a cation exchange resin, and (b) a lower layer composed of a mixed bed prepared by uniformly mixing a strongly acidic gel-type cation exchange resin and a strongly basic type 1 porous anion exchange resin having a cross-linking degree within a range from 1% to 4%.

The cation exchange resin used in the upper layer is preferably a strongly acidic gel-type cation exchange resin, and is more preferably the same ion exchange resin as the cation exchange resin incorporated within the mixed bed of the lower layer.

Furthermore, the present invention also provides a condensate demineralization apparatus for a nuclear power plant that performs a demineralization treatment of a condensate using an ion exchange resin, wherein the demineralization treatment of the condensate is performed by bringing the condensate into contact with an ion exchange resin bed including:

(a) a top layer composed of a cation exchange resin, (b) a middle layer composed of a mixed bed prepared by uniformly mixing a strongly acidic gel-type cation exchange resin and a strongly basic type 1 porous anion exchange resin having a cross-linking degree within a range from 1% to 4%, and (c) a bottom layer composed of an anion exchange resin.

The cation exchange resin used in the top layer is preferably a strongly acidic gel-type cation exchange resin, and is more preferably the same ion exchange resin as the cation exchange resin incorporated within the mixed bed of the middle layer. The anion exchange resin used in the bottom layer is preferably a strongly basic type 1 porous anion exchange resin having a cross-linking degree within a range from 1% to 4%, and is more preferably the same ion exchange resin as the anion exchange resin incorporated within the mixed bed of the middle layer.

In one aspect of the condensate demineralization apparatus of the present invention, a strongly acidic gel-type cation exchange resin having a cross-linking degree within a range from 12 to 16% is preferably used as the strongly acidic gel-type cation exchange resin.

In another aspect of the condensate demineralization method of the present invention, a strongly acidic gel-type cation exchange resin having a cross-linking degree within a range from 4 to 7% is preferably used as the strongly acidic gel-type cation exchange resin.

Furthermore, a mixed bed that has been mixed uniformly so that the existence ratio of the anion exchange resin is within ±5% of the design standard value across the entire mixed bed may be used as the above-mentioned mixed bed.

According to the present invention, by adopting a configuration wherein the demineralization treatment of a condensate is conducted by bringing the condensate into contact with an ion exchange resin bed composed of a mixed bed prepared by uniformly mixing a strongly acidic gel-type cation exchange resin and a strongly basic type 1 porous anion exchange resin having a cross-linking degree within a range from 1% to 4%, the crud within the condensate can be removed by the cation exchange resin, and the TOC eluted from the cation exchange resin can be removed by the anion exchange resin. In particular, by using a strongly basic type 1 porous anion exchange resin having a cross-linking degree within a range from 1% to 4%, the TOC removal capability can be enhanced, enabling a high-purity treated water having a low TOC-derived sulfate ion concentration to be obtained.

DETAILED DESCRIPTION OF THE INVENTION

An embodiment of the present invention is described below with reference to the drawings, although the present invention is in no way limited by this embodiment.

Figure 1:
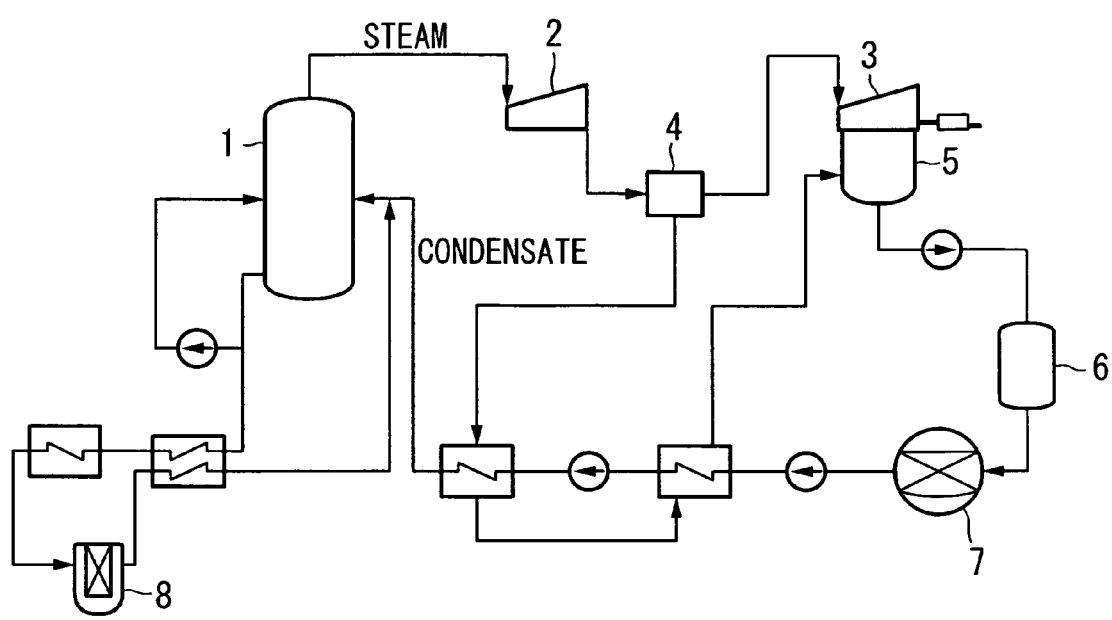
FIG. 1 is a schematic structural flow diagram illustrating an example of a BWR nuclear power plant.

FIG. 1 is a schematic structural flow diagram illustrating an example of a BWR nuclear power plant. In FIG. 1, numeral 1 represents a nuclear reactor, 2 and 3 represent turbines, 4 represents a moisture separator, 5 represents a condenser, 6 represents a condensate filtration device, 7 represents a condensate demineralization apparatus, and 8 represents a nuclear reactor purification system.

In this BWR nuclear power plant, steam is generated in the nuclear reactor 1, and this steam is used to rotate the turbines 2 and 3 to generate electricity. The steam emerging from the turbine 3 is cooled and returned to water by the condenser 5, is subsequently purified in the condensate filtration device 6 and the condensate demineralization apparatus 7, which act as purification units, and is then fed back into the nuclear reactor 1.

The steam generator side of a pressurized water reactor (PWR) nuclear power plant operates in a similar manner to a BWR nuclear power plant, wherein steam is generated in the steam generator, this steam is used to generate electricity via turbines, a condenser is used to return the steam to water, and the water is then purified and fed back into the steam generator.

Figure 2:
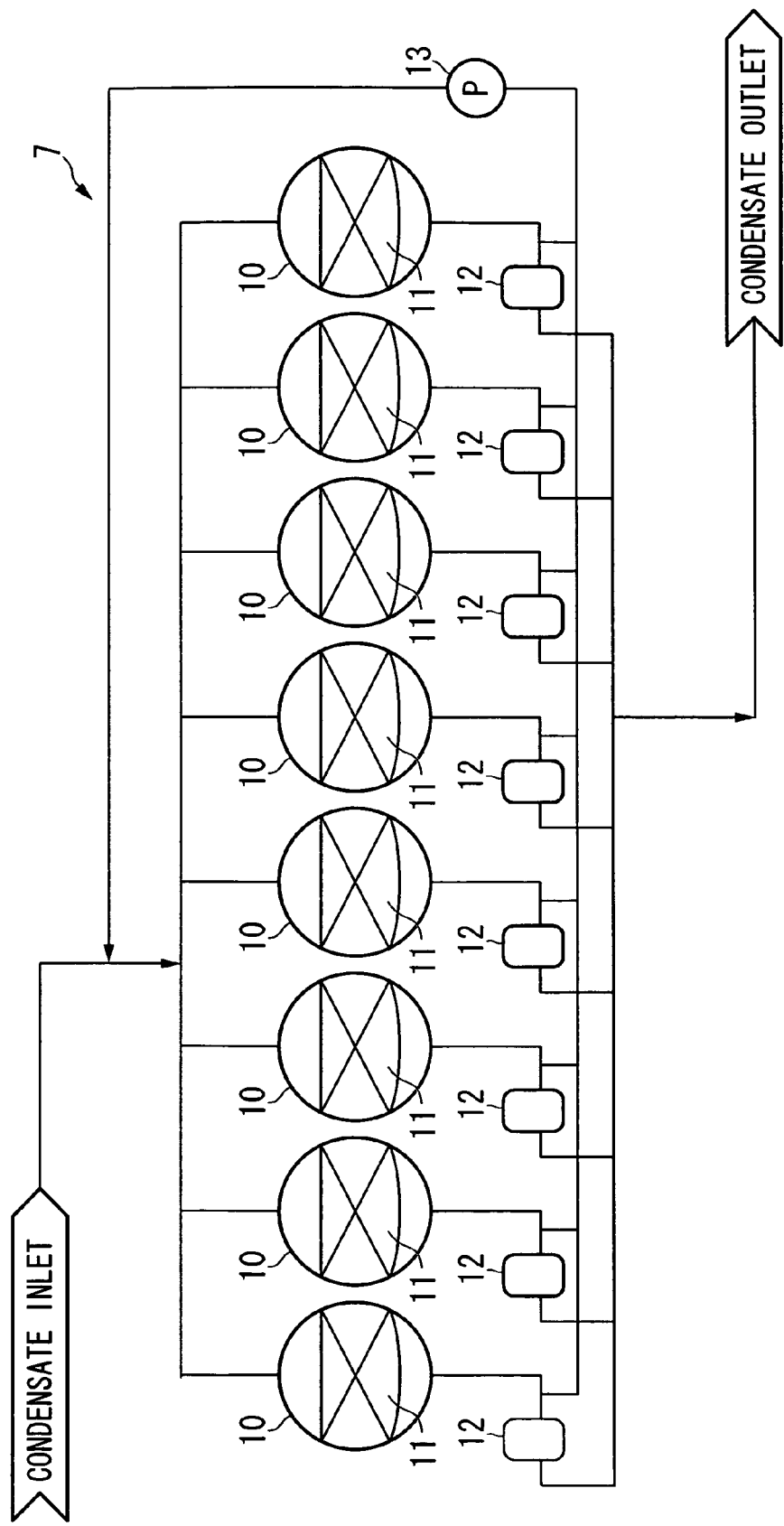
FIG. 2 is a schematic structural flow diagram illustrating an embodiment of a condensate demineralization apparatus of the present invention.

FIG. 2 is a schematic structural flow diagram illustrating an embodiment of a condensate demineralization apparatus of the present invention. In FIG. 2, numeral 7 represents the condensate demineralization apparatus, 10 represents a demineralization tower, 11 represents an ion exchange resin bed, 12 represents a resin strainer, and 13 represents a recirculation pump. In this condensate demineralization apparatus 7, the condensate is treated at a flow rate of 2,000 to 7,000 m³/h, using 3 to 10 demineralization towers 10. A single demineralization tower 10 is filled with 2,000 to 15,000 L of ion exchange resin depending on the treatment flow rate, thus forming the ion exchange resin bed 11. The bed height of the ion exchange resin bed 11 is within a range from 90 to 200 cm, and is typically approximately 100 cm. Furthermore, the linear flow rate of water through the ion exchange resin bed is set within a range from 50 to 200 m/h, and is typically approximately 100 m/h.

FIG. 3A to FIG. 3D are schematic structural diagrams illustrating examples of the structure of the ion exchange resin bed 11 within a demineralization tower according to the present invention.

Figure 3A:
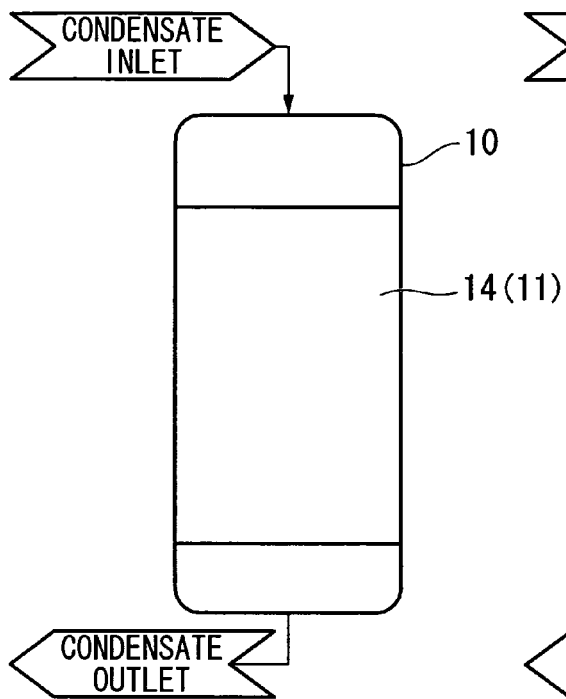
FIG. 3A is a schematic structural diagram illustrating an example of the structure of the ion exchange resin bed within a demineralization tower.

In the first example illustrated in FIG. 3A, the ion exchange resin bed 11 is formed using a mixed bed 14 prepared by uniformly mixing a strongly acidic gel-type cation exchange resin and a strongly basic type 1 porous anion exchange resin having a cross-linking degree within a range from 1% to 4%.

Figure 3B:
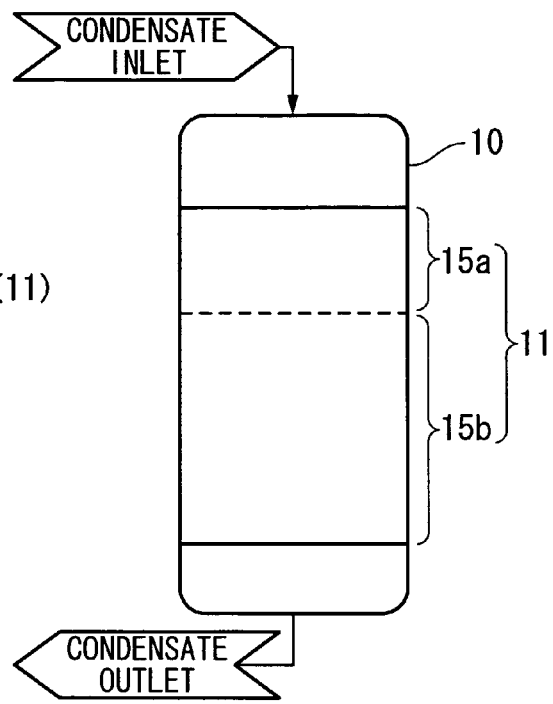
FIG. 3B is a schematic structural diagram illustrating another example of the structure of the ion exchange resin bed within a demineralization tower.

In the second example illustrated in FIG. 3B, the ion exchange resin bed 11 is formed from (a) an upper layer 15a composed of a mixed bed prepared by uniformly mixing a strongly acidic gel-type cation exchange resin and a strongly basic type 1 porous anion exchange resin having a cross-linking degree within a range from 1% to 4%, and (b) a lower layer 15b composed of an anion exchange resin.

The anion exchange resin used in the lower layer is preferably a strongly basic type 1 porous anion exchange resin having a cross-linking degree within a range from 1% to 4%, and is more preferably the same ion exchange resin as the anion exchange resin incorporated within the mixed bed of the upper layer.

Figure 3C:
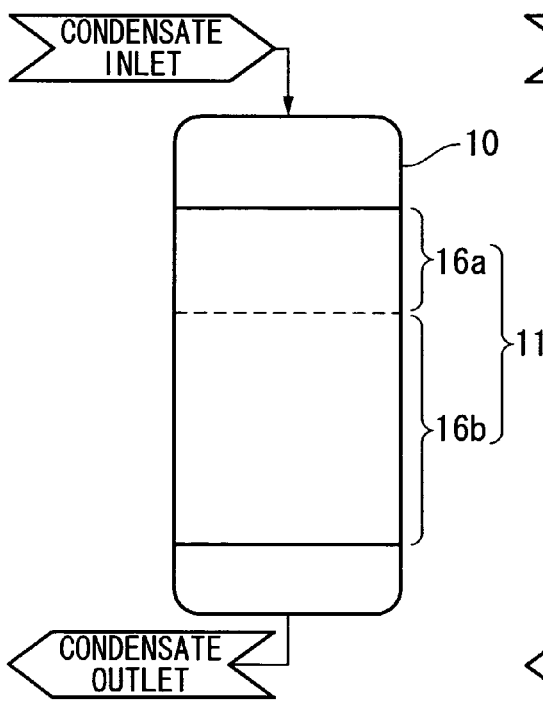
FIG. 3C is a schematic structural diagram illustrating yet another example of the structure of the ion exchange resin bed within a demineralization tower.

In the third example illustrated in FIG. 3C, the ion exchange resin bed 11 is formed from (a) an upper layer 16a composed of a cation exchange resin, and (b) a lower layer 16b composed of a mixed bed prepared by uniformly mixing a strongly acidic gel-type cation exchange resin and a strongly basic type 1 porous anion exchange resin having a cross-linking degree within a range from 1% to 4%.

The cation exchange resin used in the upper layer is preferably a strongly acidic gel-type cation exchange resin, and is more preferably the same ion exchange resin as the cation exchange resin incorporated within the mixed bed of the lower layer.

Figure 3D:
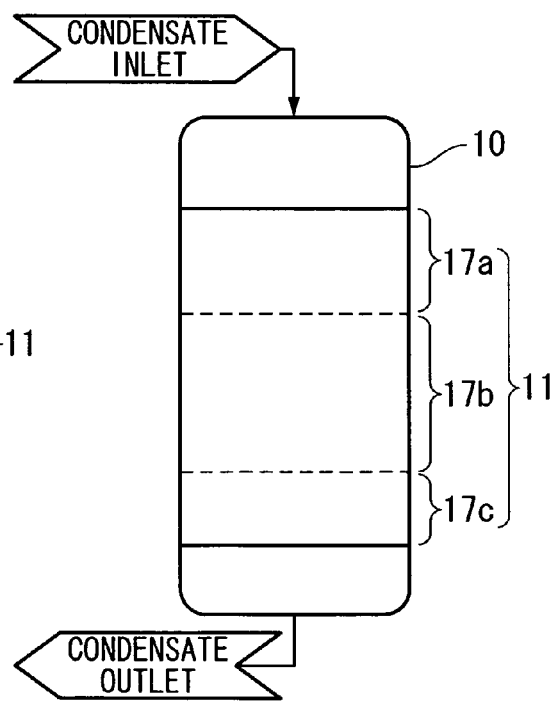
FIG. 3D is a schematic structural diagram illustrating yet another example of the structure of the ion exchange resin bed within a demineralization tower.

In the fourth example illustrated in FIG. 3D, an ion exchange resin bed 11 with a 3-layer structure is formed by sequential positioning of (a) a top layer 17a composed of a cation exchange resin, (b) a middle layer 17b composed of a mixed bed prepared by uniformly mixing a strongly acidic gel-type cation exchange resin and a strongly basic type 1 porous anion exchange resin having a cross-linking degree within a range from 1% to 4%, and (c) a bottom layer 17c composed of an anion exchange resin.

The cation exchange resin used in the top layer is preferably a strongly acidic gel-type cation exchange resin, and is more preferably the same ion exchange resin as the cation exchange resin incorporated within the mixed bed of the middle layer. The anion exchange resin used in the bottom layer is preferably a strongly basic type 1 porous anion exchange resin having a cross-linking degree within a range from 1% to 4%, and is more preferably the same ion exchange resin as the anion exchange resin incorporated within the mixed bed of the middle layer.

Furthermore, a mixed bed that has been mixed uniformly so that the existence ratio of the anion exchange resin is within ±5% of the design standard value across the entire mixed bed may be used as the above-mentioned mixed bed.

In the present invention, when the resin copolymer is produced using styrene and the cross-linking agent divinylbenzene (DVB) as raw materials, the "cross-linking density" of the ion exchange resin describes the mass ratio of the cross-linking agent DVB within the total mass of raw materials.

Almost all of the properties of the ion exchange resin are determined by the cross-linking degree that indicates the proportion of divinylbenzene added to the resin. In particular, the resin water content and ion exchange capacity exhibit a clear correlation with the cross-linking degree. The relationship between the cross-linking degree and other resin properties generally include the following relationships. Namely, compared with resins having a high cross-linking degree, resins with a low cross-linking degree have a smaller exchange capacity per unit volume in a swollen state, and a higher water content. The micropore size is large, reaction rate is excellent, and the regeneration characteristics are also superior. On the other hand, the physical strength is poor, and the oxidation resistance is inferior. Ion exchange resins having the most appropriate cross-linking degree for the required performance level are selected with due consideration of the properties described above, and then supplied to the various water treatment facilities.

Porous anion exchange resins typically used within the condensate demineralization apparatus of nuclear power plants, such as IRA900 marketed by Rohm and Haas Japan Co., Ltd. and PA312 marketed by Mitsubishi Chemical Corporation, have a cross-linking degree of 6 to 8%, but because these porous ion exchange resins have macropores, the resin matrix portion tends to have an extremely dense structure, and this dense resin matrix structure inhibits diffusion of adsorbed material into the interior of the resin particles, meaning the ability of the resin to remove organic material is not particularly high.

In the present invention, a strongly basic type 1 porous anion exchange resin having a cross-linking degree within a range from 1% to 4% is combined with a cation exchange resin, and this combination is used as the ion exchange resin bed 11. This porous anion exchange resin having a low cross-linking degree has a sparse resin matrix structure, and therefore exhibits a superior removal capability for organic substances, and particularly for the organic matter (TOC) composed mainly of polystyrenesulfonic acids with a molecular weight of 1,000 or greater eluted from the cation exchange resin, meaning a high-purity water can be obtained.

The features of porous anion exchange resins and gel-type anion exchange resins are described below. Particulate ion exchange resins can be broadly classified into two ion exchange resin types depending on the production method used, namely, transparent gel-type ion exchange resins, which are produced by forming a copolymer by suspension polymerization of styrene and divinylbenzene, and subsequently introducing functional groups into this copolymer, and porous ion exchange resins having macropores, which are produced by adding an organic solvent that is insoluble in water but readily dissolves styrene and the like during the suspension polymerization, and then removing the organic solvent following the polymerization. Identifying the two types of resin is extremely simple, as the transparent spheres are gel-type resins, whereas the opaque spheres are porous resins. Besides this visual identification, identification can also be conducted using a stereomicroscope, and when observation is conducted using a transmitted light, resins in which the light is transmitted and the entire resin can be seen are gel-type resins, whereas resins in which the transmitted light is scattered, revealing black areas, are porous resins.

The physical properties of the two resin types are very different, with a gel-type ion exchange resin having an average particle size of several Å and a specific surface area of less than 1 m$^2$/g, and a porous resin having an average particle size of several tens to several hundred Å and a specific surface area of several tens to several hundred m$^2$/g.

In the case of the adsorption of typical ions such as sodium ions and chloride ions, the structure of a gel-type resin presents absolutely no problems, but in the case of materials such as organic substances that have a larger molecular weight than a typical ion, gel-type resins and porous resins exhibit different removal properties due to their different structures.

An anion exchange resin contains quaternary ammonium groups, meaning the resin matrix is positively charged. Accordingly, adsorption of negatively charged organic substances can be expected. In particular, oxidative degradation of the matrix structure of the cation exchange resin can result in the elution of polystyrenesulfonic acids having a molecular weight of several hundred to several tens of thousands. Because these polystyrenesulfonic acids carry a negative charge, adsorption by the anion exchange resin would be expected, but in the case of a gel-type resin, because the average particle size is a small value of only several Å, adsorption is only possible at the surface of the resin particles, and because the specific surface area is also a small value of less than 1 m$^2$/g, the removal capacity is relatively poor.

In contrast, a porous resin has an average particle size of several tens to several hundred Å and a specific surface area of several tens to several hundred m$^2$/g, which are two or more orders of magnitude larger than the values for a gel-type resin, and therefore these large polystyrenesulfonic acids can be adsorbed at the resin particle surface and then readily incorporated within the interior of the resin particle.

Furthermore, porous anion exchange resins having a low cross-linking degree exhibit poor abrasion resistance, and therefore in order to enable such resins to be combined with a gel-type cation exchange resin that requires regular backwashing, some innovative operating methods are required. Abrasion of the ion exchange resin occurs mainly during transport or air scrambling of the resin particles. Accordingly, the drawbacks associated with the physical properties of porous anion exchange resins having a cross-linking degree within a range from 1% to 4% can be avoided by adopting techniques such as filling the receiving tank with water during transfer of the resin particles, thereby avoiding direct collisions between the resin particles and metal materials, lowering the concentration of the slurry used during transfer of the resin particles, thereby reducing the abrasion caused by contact between resin particles, and altering the air scrambling process that is conducted in a mixed resin state by first separating the cation exchange resin and the anion exchange resin, and then conducting the process using only the cation exchange resin particles having large quantities of crud adhered thereto.

On the other hand, in addition to the strength problem described above, resins with a low cross-linking degree also suffer from a small exchange capacity. Whereas the exchange capacity of a typically employed porous anion exchange resin with a cross-linking degree of 8% is approximately 1.0 eq/L, the exchange capacity of a porous anion exchange resin with a cross-linking degree of 1.5% is approximately 0.5 eq/L. However, in nuclear power plants, the concentration of impurities within the condensate is suppressed to very low levels by producing the condenser from titanium, maintaining and controlling the pure water supplied to the reactor at a very high level of purity, and ensuring a high level of purity for the chemicals such as ammonia introduced into the system, and consequently the ion loading from one year of water supply is approximately 0.05 eq/L at most. Accordingly, even with an exchange capacity of approximately 0.5 eq/L, and even if the effective utilization ratio of that capacity is assumed to be a low value of 50%, the exchange resin can still be used for 5 years, which represents no significant problem.

For the reasons outlined above, use of a porous anion exchange resin having a cross-linking degree within a range from 1% to 4% is able to enhance the TOC adsorption capabilities.

Examples of the strongly basic type 1 porous anion exchange resin used in the present invention include PA306 (cross-linking degree: approximately 3%) and PA308 (cross-linking degree: approximately 4%) marketed by Mitsubishi Chemical Corporation, and TAN1 (cross-linking degree: approximately 1.5%) manufactured by Dow Chemical Japan Ltd., and any of these products may be used.

Moreover, by employing certain innovations in the method of forming the ion exchange resin bed 11 within the demineralization tower, treated water with an even higher level of purity can be obtained.

The condensate demineralization apparatus typically uses a mixed bed in which the cation exchange resin and the anion exchange resin are in a mixed state (see FIG. 3A). The reason for using this mixed state is to facilitate an efficient reaction between the released H ions and OH ions to form water when the H-type cation exchange resin and the OH-type anion exchange resin undergo an ion exchange reaction. However nowadays, because the concentration of introduced impurities is able to be suppressed and maintained at an extremely low level, sulfate ions derived from the TOC such as polystyrenesulfonic acids eluted from the cation exchange resin represent the vast majority of impurities within the nuclear reactor or steam generator, and reducing the concentration of this TOC derived from the cation exchange resin is highly desirable. Accordingly, employing innovative positioning of the ion exchange resins within the demineralization tower is desirable. Three such innovative positioning methods are described below.

(1) A condensate demineralization method in which treatment of the condensate is conducted by forming an ion exchange resin bed inside the demineralization tower in which a mixed bed of a cation exchange resin and an anion exchange resin is positioned as the upper layer, and an anion exchange resin is positioned as the lower layer (see FIG. 3B).

(2) A condensate demineralization method in which treatment of the condensate is conducted by forming an ion exchange resin bed in which the resin distribution inside the demineralization tower is such that a cation exchange resin is positioned as the upper layer, and a mixed bed of a cation exchange resin and an anion exchange resin is positioned as the lower layer (see FIG. 3C).

(3) A condensate demineralization method in which treatment of the condensate is conducted by forming a 3-layer ion exchange resin bed in which the resin distribution inside the demineralization tower is such that a cation exchange resin is positioned as the top layer, a mixed bed of a cation exchange resin and an anion exchange resin is positioned as the middle layer, and an anion exchange resin is positioned as the lower layer (see FIG. 3D).

By combining these types of methods for forming the ion exchange resin bed with a porous anion exchange resin having a cross-linking degree within a range from 1% to 4%, water of even higher purity can be obtained. These types of ion exchange resin bed positioning methods can be executed relatively easily by employing the regeneration facilities such as a cation exchange resin regeneration tower, anion exchange resin regeneration tower and/or resin storage facility that may be included within the condensate demineralization apparatus.

The cation exchange resin used in the present invention is preferably a strongly acidic gel-type cation exchange resin having a cross-linking degree of 8% to 10%, although the two types of cation exchange resins described below may also be used.

(1) A strongly acidic gel-type cation exchange resin having a cross-linking degree of 12% to 16%.

(2) A strongly acidic gel-type cation exchange resin having a cross-linking degree of 4% to 7%.

Examples include the types of cation exchange resins that are widely used in the condensate demineralization apparatus of nuclear power plants, and a specific example is the strongly acidic gel-type cation exchange resin HCR-W2-H with a cross-linking density of 8% (manufactured by Dow Chemical Japan Ltd.).

Furthermore, these cation exchange resins may be subjected to an oxidation treatment. An example of a method of conducting such an oxidation treatment involves first immersing the cation exchange resin in an aqueous solution of ferric sulfate to load the resin with approximately 15 g/L of iron ions, subsequently immersing the resin in a 0.5% aqueous solution of hydrogen peroxide for 6 hours at 40° C., and then washing the resin thoroughly with water.

For example, the strongly acidic gel-type cation exchange resin HCR-W2-H with a cross-linking density of 8% may be subjected to an oxidation treatment, and the resulting treated cation exchange resin then used as the cation exchange resin within the present invention.

In the present invention, by adopting a configuration in which demineralization treatment of a condensate is performed by bringing the condensate into contact with an ion exchange resin bed containing a mixed bed prepared by uniformly mixing a strongly acidic gel-type cation exchange resin and a strongly basic type 1 porous anion exchange resin having a cross-linking degree within a range from 1% to 4%, the crud within the condensate can be removed by the cation exchange resin, and the TOC eluted from the cation exchange resin can be removed by the anion exchange resin. In particular, using the strongly basic type 1 porous anion exchange resin having a cross-linking degree within a range from 1% to 4% enhances the TOC removal capability, meaning a high-purity treated water having a low concentration of TOC-derived sulfate ions can be obtained.

In a BWR nuclear power plant, it is desirable to maintain the nuclear reactor water quality at a high level of purity in order to inhibit corrosion of the structural materials used in the nuclear reactor and maintain the reactor in good condition. The main impurity within the nuclear reactor water is sulfate ions, and the source of these sulfate ions is the TOC generated from the cation exchange resin used in the condensate demineralization apparatus. Moreover, when the water exiting from the condensate demineralization apparatus is supplied to the nuclear reactor, the water volatilization inside the nuclear reactor increases the impurity concentration by a factor of 50- to 100-fold, meaning there is considerable merit to reducing the TOC within the water exiting the condensate demineralization apparatus, even if the degree of this reduction is minimal.

In those cases where the ion exchange resin being used inside the condensate demineralization apparatus is new, the sulfate ion concentration within the nuclear reactor water is typically approximately 1 µg/L, but as the resin is used, oxidative degradation of the cation exchange resin gradually progresses, and the amount of organic impurities eluted from the cation exchange resin increases, until the concentration of the sulfate ions within the reactor water reaches approximately 5 µg/L at the end of the ion exchange resins lifespan. At this point, the ion exchange resin is replaced.

Accordingly, if the amount of TOC leakage from the condensate demineralization apparatus can be reduced, then the sulfate ion concentration within the nuclear reactor water can be reduced, the structural materials of the nuclear reactor can be more easily maintained in good condition, and the usable lifespan of the ion exchange resin can be extended, which is not only advantageous from an economical perspective, but also enables a reduction in the amount of radioactive waste, which is extremely desirable.

Moreover, in recent years there have been considerable demands for further improvements in the purity of the nuclear reactor water in order to enable the structural materials of the nuclear reactor to be more easily maintained in good condition. Various measures have been investigated in order to meet these demands, and the present invention is an extremely effective method in this regard.

EXAMPLES

A more detailed description of the present invention is presented below using a series of examples, although the present invention is in no way limited by these examples.

Example 1

The strongly acidic gel-type cation exchange resin HCR-W2-H with a cross-linking density of 8% (manufactured by Dow Chemical Japan Ltd.), which is widely used as the ion exchange resin within the condensate demineralization apparatus of nuclear power plants, was subjected to an oxidation treatment and then combined with a variety of different anion exchange resins, and the eluted TOC concentration was measured for each combination. The oxidation treatment was conducted by first immersing the cation exchange resin in an aqueous solution of ferric sulfate to load the resin with approximately 15 g/L of iron ions, subsequently immersing the resin in a 0.5% aqueous solution of hydrogen peroxide for 6 hours at 40° C., and then washing the resin thoroughly with water.

<Case 1>

A mixed bed of the above cation exchange resin HCR-W2-H+an anion exchange resin SBR-PC-OH manufactured by The Dow Chemical Company.

<Case 2>

A mixed bed of the above cation exchange resin HCR-W2-H+a porous anion exchange resin PA312 with a cross-linking degree of 6% manufactured by Mitsubishi Chemical Corporation.

<Case 3>

A mixed bed of the above cation exchange resin HCR-W2-H+a porous anion exchange resin PA308 with a cross-linking degree of 4% manufactured by Mitsubishi Chemical Corporation.

<Case 4>

A mixed bed of the above cation exchange resin HCR-W2-H+a porous anion exchange resin TAN1 with a cross-linking degree of 1.5% manufactured by The Dow Chemical Company.

Figure 4:
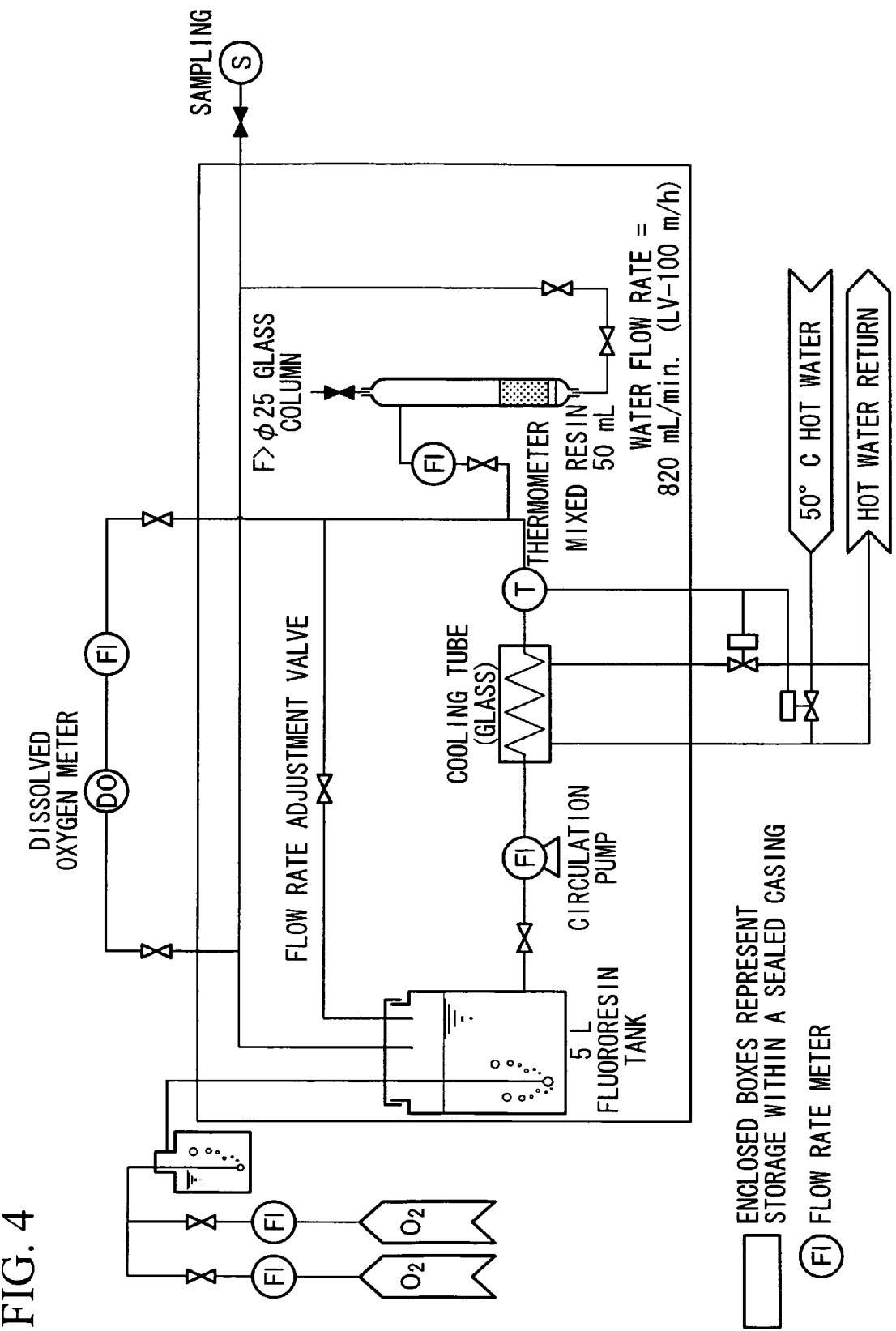
FIG. 4 is a structural flow diagram of a test apparatus used in the examples.

The test apparatus used is illustrated in FIG. 4. A column with an internal diameter of 25 mm was filled with a mixed resin prepared by mixing the cation exchange resin and the anion exchange resin in a volumetric ratio of 2/1, and pure water that had been adjusted to a temperature of 40° C. was circulated through the system. The water exiting the column was sampled periodically, a TOC meter "TOC-5000" manufactured by Shimadzu Corporation was used to measure the TOC concentration, and the TOC elution rate was calculated. The results are shown in Table 1.

TABLE 1

|        | TOC elution rate (g · (m³ · h)) |
|--------|---------------------------------|
| Case 1 | 0.23                            |
| Case 2 | 0.23                            |
| Case 3 | 0.20                            |
| Case 4 | 0.18                            |

As is evident from Table 1, case 3 and case 4 which represent ion exchange resin combinations according to the present invention had a lower sulfate ion concentration within the water than case 1 and case 2 which represent the conventional technology, confirming that the present invention yields a superior TOC removal capability.

Example 2

The strongly acidic gel-type cation exchange resin HCR-W2-H with a cross-linking density of 8% (manufactured by Dow Chemical Japan Ltd.), which is widely used as the ion exchange resin within the condensate demineralization apparatus of nuclear power plants, was subjected to an oxidation treatment, and was then combined either with the porous anion exchange resin TAN1 with a cross-linking degree of 1.5% manufactured by The Dow Chemical Company, which represents an anion exchange resin according to the present invention, or with the conventionally used anion exchange resin SBR-PC-OH manufactured by The Dow Chemical Company. Ion exchange resin beds were formed in accordance with case 5 to case 8 described below, and the eluted TOC concentration was measured for each resin bed. The oxidation treatment was conducted by first immersing the cation exchange resin in an aqueous solution of ferric sulfate to load the resin with approximately 15 g/L of iron ions, subsequently immersing the resin in a 0.5% aqueous solution of hydrogen peroxide for 6 hours at 40° C., and then washing the resin thoroughly with water.

<Case 5>
A mixed bed of the above cation exchange resin HCR-W2-H and the anion exchange resin SBR-PC-OH.
<Case 6>
A mixed bed of the above cation exchange resin HCR-W2-H and the anion exchange resin TAN1.
<Case 7>
An ion exchange resin bed in which the above cation exchange resin HCR-W2-H was positioned as the upper layer, and a mixed bed of the above cation exchange resin HCR-W2 and the anion exchange resin TAN1 was positioned as the lower layer.
<Case 8>
An ion exchange resin bed in which a mixed bed of the above cation exchange resin HCR-W2-H and the anion exchange resin TAN1 was positioned as the upper layer, and the anion exchange resin TAN1 was positioned as the lower layer.

Testing was conducted under conditions that simulated those in an actual plant, with the water quality of the treatment water, the temperature, the ion exchange resin bed height, and the linear flow rate of the water through the resin bed all set to values equivalent to those observed in an actual plant.

A column with an internal diameter of 25 mm was filled with a mixed bed prepared by mixing the cation exchange resin and the anion exchange resin in a volumetric ratio of 2/1, an ion exchange resin bed of case 7 in which half of the cation exchange resin was positioned as the upper layer and a mixed bed composed of the remainder of the cation exchange resin and the anion exchange resin was positioned as the lower layer, or an ion exchange resin bed of case 8 in which half of the anion exchange resin was positioned as the lower layer and a mixed bed composed of the remainder of the anion exchange resin and the cation exchange resin was positioned as the upper layer, pure water at 45° C. having a conductivity of 0.006 mS/m was passed through the column, and the ion concentration within the treated water was analyzed by irradiating the treated water with ultraviolet light to decompose the TOC within the water and then measuring the concentration of the generated sulfate ions by ion chromatography. The results are shown in Table 2.

TABLE 2

|        | Sulfate ion concentration within treated water (µg/L) |
|--------|-------------------------------------------------------|
| Case 5 | 5.0                                                   |
| Case 6 | 4.0                                                   |
| Case 7 | 3.0                                                   |
| Case 8 | 2.0                                                   |

As is clear from the results in Table 2, cases 6 to 8 according to the present invention exhibited a lower sulfate ion concentration than case 5 according to the conventional technology, confirming that the present invention yields a superior TOC removal capability.

What is claimed is:

1. A condensate demineralization method, comprising:
   performing a demineralization treatment of a condensate from a nuclear power plant using an ion exchange resin, wherein
   the demineralization treatment of the condensate is performed by bringing the condensate into contact with an ion exchange resin bed, wherein
   the ion exchange resin bed comprises a mixed bed containing a strongly acidic gel-type cation exchange resin and a strongly basic type 1 porous anion exchange resin;
   a cross-linking degree of the strongly basic type 1 porous anion exchange resin is within a range from 1% to 3%; and
   the cation exchange resin and the anion exchange resin are mixed uniformly in the mixed bed, and
   removing organic impurities (TOC) composed mainly of polystyrenesulfonic acid eluted from the strongly acidic gel-type cation exchange resin.

2. The condensate demineralization method according to claim 1, wherein
   the ion exchange resin bed is a single-layer ion exchange resin bed.

3. A condensate demineralization method according to claim 2, wherein
   a cross-linking degree of the strongly acidic gel-type cation exchange resin is within a range from 12 to 16%.

4. A condensate demineralization method according to claim 2, wherein
   a cross-linking degree of the strongly acidic gel-type cation exchange resin is within a range from 4 to 7%.

5. A condensate demineralization method according to claim 2, wherein a cross-linking degree of the strongly acidic gel-type cation exchange resin is within a range from 8 to 10%.

6. The condensate demineralization method according to claim 1, wherein
the ion exchange resin bed is a ion exchange resin bed having a plurality of layers.

7. A condensate demineralization method according to claim 6, wherein
the ion exchange resin bed comprises an upper layer composed of the mixed bed, and further comprises
a lower layer composed of an anion exchange resin.

8. A condensate demineralization method according to claim 7, wherein
a cross-linking degree of the strongly acidic gel-type cation exchange resin is within a range from 12 to 16%.

9. A condensate demineralization method according to claim 7, wherein
a cross-linking degree of the strongly acidic gel-type cation exchange resin is within a range from 4 to 7%.

10. A condensate demineralization method according to claim 7, wherein
a cross-linking degree of the strongly acidic gel-type cation exchange resin is within a range from 8 to 10%.

11. A condensate demineralization method according to claim 6, wherein
the ion exchange resin bed comprises a lower layer composed of the mixed bed, and further comprises
an upper layer composed of a cation exchange resin.

12. A condensate demineralization method according to claim 11, wherein
a cross-linking degree of the strongly acidic gel-type cation exchange resin is within a range from 12 to 16%.

13. A condensate demineralization method according to claim 11, wherein
a cross-linking degree of the strongly acidic gel-type cation exchange resin is within a range from 4 to 7%.

14. A condensate demineralization method according to claim 11, wherein
a cross-linking degree of the strongly acidic gel-type cation exchange resin is within a range from 8 to 10%.

15. A condensate demineralization method according to claim 6, wherein
the ion exchange resin bed comprises a middle layer composed of the mixed bed, and further comprises
a top layer composed of a cation exchange resin, and
a bottom layer composed of an anion exchange resin.

16. The condensate demineralization method according to claim 1, wherein the organic impurities (TOC) composed mainly of polystyrenesulfonic acids have a molecular weight of 1,000 or greater eluted from the strongly acidic gel-type cation exchange resin.

17. The condensate demineralization method according to claim 1, wherein the removing organic impurities (TOC) includes using the strongly basic type 1 porous anion exchange resin to remove organic impurities (TOC).

* * * * *